(12) United States Patent
Prissok et al.

(10) Patent No.: US 9,714,332 B2
(45) Date of Patent: Jul. 25, 2017

(54) COMBINATION FOAM

(71) Applicant: BASF SE, Ludwigshafen (DE)

(72) Inventors: Frank Prissok, Lemfoerde (DE); Michael Harms, Diepholz (DE); Martin Vallo, Bramsche (DE)

(73) Assignee: BASF SE, Ludwigshafen (DE)

( * ) Notice: Subject to any disclaimer, the term of this patent is extended or adjusted under 35 U.S.C. 154(b) by 53 days.

(21) Appl. No.: 14/420,555

(22) PCT Filed: Aug. 8, 2013

(86) PCT No.: PCT/EP2013/066613
§ 371 (c)(1),
(2) Date: Feb. 9, 2015

(87) PCT Pub. No.: WO2014/023794
PCT Pub. Date: Feb. 13, 2014

(65) Prior Publication Data
US 2015/0197617 A1    Jul. 16, 2015

(30) Foreign Application Priority Data

Aug. 9, 2012 (EP) .................................. 12179836

(51) Int. Cl.
*C08J 9/35* (2006.01)
*C08G 18/10* (2006.01)

(52) U.S. Cl.
CPC ............. *C08J 9/35* (2013.01); *C08G 18/10* (2013.01); *C08J 2205/05* (2013.01); *C08J 2205/052* (2013.01); *C08J 2205/06* (2013.01); *C08J 2205/08* (2013.01); *C08J 2300/22* (2013.01); *C08J 2375/04* (2013.01); *C08J 2375/08* (2013.01); *C08J 2475/08* (2013.01)

(58) Field of Classification Search
CPC ... C08J 9/12; C08J 9/35; C08J 2475/04; C08J 2475/08; C08J 2205/05; C08J 2205/052; C08J 2205/06; C08J 2205/08; C08J 2300/22; C08J 2375/04; C08J 2385/08; C08G 18/10; C08G 18/6674; C08G 18/664; C08G 18/6696; C08G 18/4854; C08G 2350/00; C08G 2410/00; A43B 13/04; A43B 13/18; B29C 44/1285; B29C 35/0009; B29D 35/00; B29L 2031/50
See application file for complete search history.

(56) References Cited

U.S. PATENT DOCUMENTS

| | | | |
|---|---|---|---|
| 3,615,972 A | 10/1971 | Morehouse, Jr. et al. | |
| 4,510,702 A * | 4/1985 | Ehrlich, Jr. ............ | A43B 13/04 36/103 |
| 4,764,537 A | 8/1988 | Horn et al. | |
| 2001/0031797 A1* | 10/2001 | Kuwamura ............ | C08G 18/10 521/155 |
| 2004/0039146 A1* | 2/2004 | Shidaker .............. | C08G 18/089 528/48 |
| 2006/0035990 A1* | 2/2006 | Hennington ........... | C08G 18/10 521/99 |
| 2010/0047550 A1 | 2/2010 | Prissok et al. | |
| 2013/0225708 A1 | 8/2013 | Prissok et al. | |
| 2013/0227861 A1 | 9/2013 | Prissok et al. | |
| 2014/0017450 A1* | 1/2014 | Baghdadi ............ | B29C 44/3415 428/160 |

FOREIGN PATENT DOCUMENTS

| | | |
|---|---|---|
| DE | 36 07 447 A1 | 9/1987 |
| EP | 0 153 639 A2 | 9/1985 |
| WO | WO 94/20568 A1 | 9/1994 |
| WO | WO 2006/015440 A1 | 2/2006 |
| WO | WO 2007/082838 A1 | 7/2007 |
| WO | WO 2008/087078 A1 | 7/2008 |
| WO | WO 2012/065926 A1 | 5/2012 |
| WO | WO 2014/006182 A1 | 1/2014 |

OTHER PUBLICATIONS

International Search Report issued Jan. 2, 2014 in PCT/EP2013/066613.
Kunststoffhandbuch, Band 7, Polyurethane, Carl Hanser Verlag, 3$^{rd}$ edition, Auflage 1993, Kapitel 3.1 pp. 58-75 and Cover Page and Abstract.
U.S. Appl. No. 14/420,555, filed Feb. 9, 2015, Prissok, et al.
U.S. Appl. No. 14/412,233, filed Dec. 31, 2014, Spies, et al.

* cited by examiner

*Primary Examiner* — John Cooney
(74) *Attorney, Agent, or Firm* — Oblon, McClelland, Maier & Neustadt, L.L.P.

(57) ABSTRACT

The combination foam comprises a matrix composed of polyurethane foam and foamed particles of thermoplastic polyurethane comprised therein, where matrix and particles are each made up of polyol components and polyisocyanate components, wherein at least 50% by weight of the basic building blocks forming the polyol component of the matrix and particles are identical and at least 50% by weight of the basic building blocks forming the polyisocyanate component of the matrix and particles are identical.

13 Claims, No Drawings

COMBINATION FOAM

The invention relates to a combination foam which comprises a matrix of polyurethane foam and foamed particles of thermoplastic polyurethane comprised therein, its use and a process for producing it.

Polyurethanes are nowadays used in many applications because of their broad property profile. Polyurethanes can be used both in compact form and in foamed form, with a very wide density range from compact with a density of greater than 1.00 g/cm$^3$ to about 0.01 g/cm$^3$ for foamed bodies being possible. Polyurethanes can, for example, be in the form of thermosets, elastomers, thermoplastic elastomers (TPUs), microcellular elastomers, integral foams, flexible foams, rigid foams or semirigid foams.

Combining polyurethane with other materials makes it possible to produce composites which further expand the field of use of the material "polyurethane". Thus, introduction of foamed particles into a matrix of polyurethane makes it possible to obtain hybrid materials having a reduced density and particular properties and/or to reduce the materials costs.

WO 2006/015440 discloses hybrid materials composed of a polyurethane matrix and foamed polyurethane particles, for example recycled material, comprised therein. A disadvantage of such composites composed of polyurethane and recycled polyurethane foam is only poor adhesion between the foamed recycled particles and the matrix material. Furthermore, the mechanical properties of such a material are also in need of improvement. Due to the open-cell nature of the recycled foams, these foams take up a relatively large amount of binder.

WO 2008/087078 discloses hybrid materials comprising a matrix composed of polyurethane and foamed particles of thermoplastic polyurethane comprised therein. The foamed particles of thermoplastic polyurethane are based on a polyester polyol based on adipic acid and 1,4-butanediol and diphenylmethane 4,4'-diisocyanate (4,4'-MDI). Other foamed particles of thermoplastic polyurethane are based on polytetrahydrofuran, 1,4-butanediol and 4,4'-MDI. The matrix composed of polyurethane is based on polyetherols based on propylene oxide/ethylene oxide in combination with isocyanate prepolymers based on MDI and polyetherol mixtures having an NCO content of 13.9%.

The adhesion between polyurethane matrix and foamed particles of thermoplastic polyurethane (TPU) is not sufficiently good for all applications, and the mechanical properties of the matrix foam are therefore not satisfactory for all applications.

It is an object of the present invention to provide a combination foam which displays improved adhesion between matrix material and foamed particles.

The mechanical properties, for example in respect of elasticity and ultimate tensile strength, should preferably be improved compared to the known hybrid materials.

This object is achieved according to the invention by a combination foam comprising a matrix composed of polyurethane foam and foamed particles of thermoplastic polyurethane comprised therein, where matrix and particles are each made up of polyol components and polyisocyanate components, wherein at least 50% by weight of the basic building blocks forming the polyol component of the matrix and particles are identical and at least 50% by weight of the basic building blocks forming the polyisocyanate component of the matrix and particles are identical.

The object is also achieved by use of this combination foam as shoe soles, bicycle saddles, upholstery, in components in automobile interiors and exteriors, in balls and sports equipment or as floor covering, in particular for sports surfaces, lightweight athletics tracks, sports tracks, children's playgrounds and footpaths.

The object is additionally solved by a process for producing such combination foams by reaction of the polyol components and polyisocyanate components forming the matrix composed of polyurethane foam and optionally chain extenders, crosslinkers, catalysts, blowing agents, further additives or mixtures thereof in the presence of the foaming or preferably foamed particles of thermoplastic polyurethane.

Materials in which a foam is enclosed by a foam/matrix material are for the purposes of the present invention referred to as combination foams.

Polyurethane foams comprise, for the purposes of the invention, all known foam-type polyisocyanate polyaddition products such as flexible foams, rigid foams or integral foams. Further details regarding polyurethanes may be found in "Kunststoffhandbuch, volume 7, Polyurethane", Carl Hanser Verlag, 3rd edition 1993, chapters 5-8 and 10-12.

For the purposes of the invention, polyurethane foams are preferably foams in accordance with DIN 7726. Flexible polyurethane foams according to the invention have a compressive stress at 10% compression or compressive strength in accordance with DIN 53 421/DIN EN ISO 604 of 15 kPa and below, preferably from 1 to 14 kPa and in particular from 4 to 14 kPa. Semirigid polyurethane foams according to the invention preferably have a compressive stress at 10% compression in accordance with DIN 53 421/DIN EN ISO 604 of from >15 to <80 kPa. Semirigid polyurethane foams and flexible polyurethane foams according to the invention preferably have an open cell content in accordance with DIN ISO 4590 of greater than 85%, particularly preferably greater than 90%. Further details regarding flexible polyurethane foams and semirigid polyurethane foams according to the invention may be found in "Kunststoffhandbuch, volume 7, Polyurethane", Carl Hanser Verlag, 3rd edition 1993, chapter 5.

For the purposes of the present invention, elastomeric polyurethane foams are preferably polyurethane foams in accordance with DIN 7726 which after brief deformation by 50% of the thickness in accordance with DIN 53 577 do not have a remaining deformation of more than 2% of the initial thickness after 10 minutes. Such a foam can be a semirigid polyurethane foam or flexible polyurethane foam.

Integral polyurethane foams are preferably polyurethane foams in accordance with DIN 7726 having an outer zone which, due to the shaping process, has a higher density than the core. The overall foam density averaged over the core and the outer zone is preferably above 0.1 g/cm$^3$. Integral polyurethane foams according to the invention can also be semirigid polyurethane foams or flexible polyurethane foams. Further details regarding integral polyurethane foams may be found in "Kunststoffhandbuch, volume 7, Polyurethane", Carl Hanser Verlag, 3rd edition 1993, chapter 7.

Particular preference is given to an elastomer foam or an integral foam having a density of from 0.8 to 0.1 g/cm$^3$, in particular from 0.6 to 0.3 g/cm$^3$, as matrix material.

In the combination foam of the invention, the matrix composed of polyurethane foam is preferably essentially open-cell or completely open-cell. The foamed particles of thermoplastic polyurethane which are comprised in the matrix are preferably at least partly, particularly preferably completely, closed-cell. This combination foam is produced by the closed-cell proportion of the foam being produced beforehand as expanded, closed-cell particle foam and, in a second step, mixing this with a formulation which is very similar in terms of the basic building blocks or is chemically identical, discharging and reacting the mixture. The second foam component preferably forms, as a result of the additives used, an open-cell, shrink-free matrix and joins onto the previously introduced closed-cell particles. The matrix and the particles are preferably quite predominantly or virtually chemically identical, which results in better mechanical properties and higher elasticities together with densities which are on average lower, compared to pure particle or system foams and also compared to the hybrid materials known from WO 2008/087078. The fact that the base formulations of the closed-cell and open-cell components are largely identical results in excellent adhesion of the phases to one another, which contributes decisively to the good mechanical properties.

According to the invention, at least 50% by weight of the basic building blocks forming the polyol component of the matrix and particles are identical and at least 50% by weight of the basic building blocks forming the polyisocyanate component of the matrix and particles are identical.

The following procedure is used for determining the respective proportions by weight:

All polyol components of the matrix and of the particles are determined and listed, with the % by weight of the individual polyols based on the totality of the polyols of the respective matrix or particles, which is 100% by weight, being determined. When the individual polyols and their proportions by weight for the matrix and the particles are then compared, at least 50% by weight of the polyols of the matrix must also be comprised in the particles and vice versa. This can be explained with the aid of the examples of the present invention:

As shown in Table 1, different polyols (polyol 1, polyol 3, polyol 4 and the chain extender CE) are present in the combination foams of the invention, while polyol 1 and chain extender CE are present in the TPU particles (ETPU). Based on the sum of polyols (polyols 1 to 6 plus chain extender), the proportion of polyol 1 is 68.8% and the proportion of chain extender is 7.5% in Example 1. In the ETPU, the proportion of polyol 1 is 91.8% and the proportion of chain extender is 8.2%. Polyol 1 (68.8%) and chain extender (7.5%) are, in Example 1, identical to the respective components of the ETPU, thus a total of 76.3% by weight.

Here, each polyol is to be related individually: if the proportion of chain extender CE in ETPU were to be significantly lower than in Example 1, only the lower of the two values could be taken as being in both formulations for the present purposes. In the example selected, the amounts as per Example 1 are in each case fully comprised in the amounts in the ETPU, so that no such distinction is necessary.

Corresponding calculations apply to the amounts of polyisocyanate component.

Consequently, the numerical values in % by weight indicate the degree of agreement between the basic building blocks of the matrix and of the TPU particles. This agreement is particularly great according to the invention, so that chemically very similar matrices and particles result, and these correspondingly display good adhesion to one another. For comparison, different polyols as described in WO 2008/087078 are used in matrix and TPU particles. Compared to these, the adhesion can be improved again according to the invention.

Preference is given to at least 60% by weight of the basic building blocks forming the polyol component of the matrix and particles being identical and at least 60% by weight of the basic building blocks forming the polyisocyanate component of the matrix and particles being identical.

Particular preference is given to at least 65% by weight of the basic building blocks forming the polyol component of the matrix and particles being identical and at least 85% by weight of the basic building blocks forming the polyisocyanate component of the matrix and particles being identical.

Here, matrix and particles are preferably present in a weight ratio in the range 0.1-10:1 in the combination foam.

According to the invention, the combination of a closed-cell particle foam with a virtually chemically identical component which is processed as system foam and displays excellent adhesion to the particle foam gives a product which is shrink-free even at a low density and compared to a pure system foam based on the same components displays better mechanical properties. The good adhesion of the open-cell phase to the closed-cell phase is due to the chemically largely identical make-up.

A further reason for the good mechanical properties at a relatively low density is that the combination foam represents a type of three-dimensional sandwich component.

In the idealized case, the TPU particle foam forms a bed of low-density, highly elastic, closed-cell spheres. The interstices in this bed are filled with a preferably higher-density system foam which does not shrink and because of its chemical make-up displays very good adhesion to the TPU particles.

The matched components of this three-dimensional sandwich structure display comparable elongation and ultimate tensile strength values, so that when the two phases adhere to one another well, in the event of tensile stress the open-cell, higher-density phase takes up the tensile forces and on increased elongation the embedded closed-cell particles are compressed and can thus oppose the tension with a high force. In the event of compression of the combination foam and also in the determination of the rebound resilience, the open-cell system foam passes on the pressure to the closed-cell TPU particles. The compression of the gas bubbles which are completely enclosed in an elastic matrix enables the closed-cell foam to build up a significantly higher counter-force than an open-cell foam and pass it on again.

In the case of an open-cell elastomer foam, the matrix thus essentially takes up the tensile and compressive forces, while in the case of a closed-cell system the matrix is supported both in compression and in tension by the gas bubbles (air balloon effect). The closed-cell particle foam thus reinforces the open-cell foam in terms of its mechanical behavior, even though it preferably has a lower density than the latter. However, without the open-cell foam the ultimate tensile strength of the closed-cell foam alone would not be sufficient since its density is too low for high tensile forces. The compression and rapid expansion of the gas enables the stored energy in the particles to be released again quickly, which leads to an improved rebound resilience. The density of the combination foam is determined by the individual layers and the proportions of the two phases used, viz. the preferably lower-density closed-cell foam and the preferably higher-density open-cell foam.

If, in comparison, an open-cell foam which owing to chemical incompatibility has poor adhesion to the particle foam is used, the reinforcing effect does not occur. If a binder system having an ultimate tensile strength which is too low is used, earlier failure of the component likewise occurs.

Preferred features of a combination foam based on three-dimensional open-cell and closed-cell regions are:
- closed-cell particles are surrounded by an essentially open-cell foam system;
- after production, the combination foam comprises macroscopic three-dimensional regions having closed-cell and open-cell structures;
- the closed-cell regions have a diameter of greater than 1 mm, preferably greater than 2 mm;
- the closed-cell foam and the open-cell foam are made up of essentially the same raw materials;
- the open-cell foam and the closed-cell foam are polyurethanes;
- the identical raw materials are diols and diisocyanates;
- the diols are preferably polyether diols or polyester diols;
- the diol and diisocyanate are preferably polytetrahydrofuran and MDI;
- expanded particle foam is preferably used as closed-cell foam;
- the particle foam has a lower density than the system foam.

The organic and/or modified polyisocyanates used for producing the polyurethane composites of the invention comprise the aliphatic, cycloaliphatic and aromatic bifunctional or polyfunctional isocyanates known from the prior art and any mixtures thereof. Examples are diphenylmethane 4,4'-diisocyanate, diphenylmethane 2,4'-diisocyanate, the mixtures of monomeric diphenylmethane diisocyanates and homologues of diphenylmethane diisocyanate having more than two rings (polymeric MDI), tetramethylene diisocyanate, hexamethylene diisocyanate (HDI), isophorone diisocyanate (IPDI), methylenedi(cyclohexyl diisocyanate) (H12MDI), tolylene 2,4- or 2,6-diisocyanate (TDI) or mixtures of the isocyanates mentioned.

Preference is given to using 4,4'-MDI. The 4,4'-MDI which is preferably used can comprise from 0 to 20% by weight of 2,4'-MDI and small amounts, up to 10% by weight, of allophanate- or uretonimine-modified polyisocyanates. Small amounts of polyphenylenepolymethylene polyisocyanate (polymeric MDI) can also be used. The total amount of these high-functionality polyisocyanates should not exceed 5% by weight of the isocyanate used.

The polyisocyanate component is preferably used in the form of polyisocyanate prepolymers for producing the open-cell system. These polyisocyanate prepolymers can be obtained by reacting the above-described polyisocyanates with polyols, for example at temperatures of from 30 to 100° C., preferably about 80° C., to form the prepolymer. To produce the prepolymers according to the invention, preference is given to using 4,4'-MDI together with uretonimine-modified MDI and commercial polyols, in particular polytetrahydrofuran or polyester polyalcohol. The uretonimine modification liquefies the prepolymer at room temperature, which aids production of the matrix system. Small proportions of polyols based on polyesters, for example derived from adipic acid, or polyethers, for example derived from ethylene oxide and/or propylene oxide, as described in WO 2008/087078, can concomitantly be used.

Polyols are known to those skilled in the art and are described, for example, in "Kunststoffhandbuch, volume 7, Polyurethane", Carl Hanser Verlag, 3rd edition 1993, chapter 3.1.

Customary chain extenders or crosslinkers are optionally added to the abovementioned polyols in the preparation of the isocyanate prepolymers. Particular preference is given to using dipropylene glycol or tripropylene glycol as chain extenders or crosslinkers.

Relatively high molecular weight compounds having at least two H atoms which are reactive toward isocyanate groups are preferably polytetrahydrofuran or polyester polyols.

Polytetrahydrofuran is prepared by known processes, for example from one or more alkylene oxides such as tetrahydrofuran by anionic polymerization using alkali metal hydroxides or alkali metal alkoxides as catalysts with addition of at least one starter molecule comprising 2 or 3 reactive hydrogen atoms in bound form or by cationic polymerization using Lewis acids such as antimony pentachloride or boride fluoride etherate. Furthermore, multimetal cyanide compounds, known as DMC catalysts, can also be used as catalysts.

Possible starter molecules are water or dihydric and trihydric alcohols such as ethylene glycol, 1,2- and 1,3-propanediol, diethylene glycol, dipropylene glycol, 1,4-butanediol, glycerol or trimethylolpropane.

The polytetrahydrofurans preferably have a functionality of from 2 to 3, preferably 2, and molecular weights of from 250 to 8000 g/mol, preferably from 500 to 4000 g/mol, in the thermoplastic polyurethane from 600 to 2500 g/mol.

Polyester polyols can, for example, be prepared from organic dicarboxylic acids having from 2 to 12 carbon atoms, preferably aliphatic dicarboxylic acids having from 4 to 10 carbon atoms, and polyhydric alcohols, preferably diols, having from 2 to 12 carbon atoms, preferably from 2 to 6 carbon atoms. Possible dicarboxylic acids are, for example: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. In place of the free dicarboxylic acids, it is also possible to use the corresponding dicarboxylic acid derivatives, e.g. dicarboxylic esters of alcohols having from 1 to 4 carbon atoms or dicarboxylic anhydrides. Preference is given to using dicarboxylic acid mixtures of succinic, glutaric and adipic acids in weight ratios of, for example, 20-35:35-50:20-32, and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol and 1,6-hexanediol. It is also possible to use polyester polyols derived from lactones, e.g. ε-caprolactone, or hydroxycarboxylic acids, e.g. ω-hydroxycaproic acid.

To prepare the polyester polyols, the organic, e.g. aromatic and preferably aliphatic, polycarboxylic acids and/or derivatives thereof and polyhydric alcohols can be polycondensed in the absence of catalysts or preferably in the presence of esterification catalysts, advantageously in an atmosphere of inert gas, e.g. nitrogen, carbon monoxide, helium, argon, etc., in the melt at temperatures of from 150 to 250° C., preferably from 180 to 220° C., optionally under reduced pressure, to the desired acid number which is preferably less than 10, particularly preferably less than 2. In a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Possible esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to distill off the water of condensation azeotropically. To prepare the polyester polyols, the organic polycarboxylic acids and/or derivatives thereof and polyhydric alcohols are advantageously polycondensed in a molar ratio of 1:1-1.8, preferably 1:1.05-1.2.

The polyester polyols obtained preferably have a functionality of from 2 to 4, in particular from 2 to 3, and a molecular weight of from 480 to 3000 g/mol, preferably from 1000 to 3000 g/mol, in the thermoplastic polyurethane from 500 to 2500 g/mol.

The polyurethane foam of the matrix can be produced without or with concomitant use of chain extenders and/or crosslinkers. However, the addition of chain extenders, crosslinkers or optionally mixtures thereof can be found to be advantageous for modifying the mechanical properties, e.g. the hardness. Chain extenders and/or crosslinkers are substances having a molecular weight of preferably less than 400 g/mol, particularly preferably from 60 to 400 g/mol, with chain extenders having 2 hydrogen atoms which are reactive toward isocyanates and crosslinkers having 3 hydrogen atoms which are reactive toward isocyanate. These can be used either individually or in the form of mixtures. Preference is given to using diols and/or triols having molecular weights of less than 400, particularly preferably from 60 to 300 and in particular from 60 to 150. Possibilities are, for example, aliphatic, cycloaliphatic and/or araliphatic diols having from 2 to 14, preferably from 2 to 10, carbon atoms, e.g. ethylene glycol, 1,2-propanediol, 1,3-propanediol, 1,3-butanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4-, 1,3,5-trihydroxycyclohexane, glycerol and trimethylolpropane, and low molecular weight hydroxyl-comprising polyalkylene oxides based on ethylene and/or 1,2-propylene oxide and the abovementioned diols and/or triols as starter molecules.

If chain extenders, crosslinkers or mixtures thereof are employed, these are advantageously used in amounts of from 1 to 60% by weight, for example from 1.5 to 50% by weight and in particular from 2 to 40% by weight, based on the weight of the polyols and chain extenders/crosslinkers.

If catalysts are used for producing the hybrid materials according to the invention, preference is given to using compounds which strongly accelerate the reaction of the polyols with the organic, optionally modified polyisocyanates. Mention may be made by way of example of amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexyl-morpholine, N,N,N',N'-tetramethylethylenediamine, N,N,N',N'-tetramethylbutanediamine, N,N,N',N'-tetramethylhexanediamine, pentamethyldiethylenetriamine, bis(dimethylaminoethyl) ether, bis(dimethylaminopropyl)urea, dimethylpiperazine, 1,2-dimethylimidazole, 1-azabicyclo[3.3.0]octane and preferably 1,4-diazabicyclo[2.2.2]octane and alkanolamine compounds such as triethanolamine, triisopropanolamine, N-methyldiethanolamine and N-ethyldiethanolamine and dimethylethanolamine. Further possibilities are organic metal compounds, preferably organic tin compounds such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates, such as bismuth(III) neodecanoate, bismuth 2-ethylhexanoate and bismuth octanoate or mixtures thereof. The organic metal compounds can be used either alone or preferably in combination with strongly basic amines. If the component (b) is an ester, preference is given to using exclusively amine catalysts.

Preference is given to using from 0.001 to 5% by weight, in particular from 0.05 to 2% by weight, of catalyst or catalyst combination, based on the weight of the polyols.

Furthermore, blowing agents can be present in the production of the polyurethane foams as matrix material. These blowing agents optionally comprise water. Apart from water, generally known chemically and/or physically acting compounds can be used instead of or in addition to water as blowing agent. For the purposes of the present invention, chemical blowing agents are compounds which react with isocyanate to form gaseous products, e.g. formic acid. Physical blowing agents are compounds which are dissolved or emulsified in the starting materials for polyurethane production and vaporize under the conditions of polyurethane formation. These are, for example, hydrocarbons, halogenated hydrocarbons and other compounds such as perfluorinated alkanes, e.g. perfluorohexane, chlorofluorocarbons, and ethers, esters, ketones and/or acetals, for example (cyclo)aliphatic hydrocarbons having from 4 to 8 carbon atoms or fluorinated hydrocarbons such as Solkane® 365 mfc. In a preferred embodiment, a mixture of these blowing agents, comprising water, is used as blowing agent; particular preference is given to using water as sole blowing agent. If no water is used as blowing agent, preference is given to using exclusively physical blowing agents. The content of water is, in one embodiment, from 0.1 to 2% by weight, preferably from 0.2 to 1.5% by weight, particularly preferably from 0.3 to 1.2% by weight, in particular from 0.4 to 1% by weight, based on the total weight of the matrix.

In a further embodiment, hollow microspheres comprising physical blowing agents are added as additional blowing agent. The hollow microspheres can also be used in admixture with water, the abovementioned chemical blowing agents and/or physical blowing agents.

The hollow microspheres usually comprise a shell of thermoplastic polymer and have a core filled with a liquid, low-boiling substance based on alkanes. The production of such hollow microspheres is described, for example, in U.S. Pat. No. 3,615,972. The hollow microspheres generally have a diameter of from 5 to 50 µm. Examples of suitable hollow microspheres can be obtained under the trade name Expancell® from Akzo Nobel.

The hollow microspheres are generally added in an amount of from 0.5 to 5%, based on the total weight of the matrix.

The particles of thermoplastic polyurethane (TPU) are produced from expandable particles, expanded particles or in a continuous process on an extruder.

The foamed particles comprise a foamed thermoplastic polyurethane material. These foamed particles preferably have a diameter of from 0.1 mm to 10 cm, preferably from 0.5 mm to 5 cm and particularly preferably from 1 mm to 2 cm, and are preferably spherical or ellipsoidal. In the case of nonspherical particles, for example ellipsoidal particles, the diameter is the longest axis. The foamed particles have a density of preferably from 0.005 to 0.50 g/cm$^3$, particularly preferably from 0.01 to 0.3 g/cm$^3$ and in particular from 0.02 to 0.2 g/cm$^3$. The foamed particles preferably have a compact outer skin. Here, a compact skin means that the foam cells in the outer region of the foamed particles are smaller than in the interior thereof. Particular preference is given to the outer region of the foamed particles not comprising any pores and the cells of the particles being closed.

The foamed particles are preferably based on a thermoplastic polyurethane for the production of which polytetrahydrofuran was used. The molecular weight of the polytetrahydrofuran used is preferably from 600 to 2500 g/mol. In a further preferred embodiment, a polyester polyalcohol having a molecular weight of from 500 to 2500 g/mol, preferably from 600 to 900 g/mol, is used for producing the foamed particles.

As expandable particles of thermoplastic polyurethane which comprise blowing agents in dispersed or dissolved form, it is possible to use, for example, particles of thermoplastic polyurethane impregnated with blowing agent. Such particles and the production thereof are described, for example, in WO 94/20568 and WO 2007/082838.

The expanded and/or expandable particles are particularly preferably produced using thermoplastic polyurethanes whose melting range in a DSC measurement at a heating rate of 20 K/min commences below 130° C., particularly preferably below 120° C., and in the case of which the thermoplastic polyurethane (also referred to as TPU) has a melt flow rate (MFR) at 190° C. under a load of 21.6 kg in accordance with DIN EN ISO 1 133 of not more than 250 g/10 min, particularly preferably a melt flow rate of less than 200 g/10 min. The thermoplastic polyurethane comprising blowing agent preferably has an average diameter of from 0.1 to 10 mm.

Such a thermoplastic polyurethane is preferably based on a polyalcohol, particularly preferably a polyether diol. Here, polytetrahydrofuran is particularly preferred. The TPU is particularly preferably based on polytetrahydrofuran having a molecular weight in the range from 600 g/mol to 2500 g/mol. The polyalcohols can be employed either individually or in admixture with one another.

As an alternative, good results can be achieved using TPU based on polyester alcohol, preferably polyester diol, preferably based on adipic acid and 1,4-butanediol, having a molecular weight in the range from 500 to 2500 g/mol, particularly preferably from 600 g/mol to 900 g/mol.

Thermoplastic polyurethane used according to the invention is produced, for example, by reacting isocyanates (d) with compounds which are reactive toward isocyanates and have a molecular weight of from 500 to 10 000 (c2) and optionally chain extenders having a molecular weight of from 50 to 499 (c3), optionally in the presence of catalysts (c4) and/or customary auxiliaries and/or additives (c5).

As organic isocyanates (d), it is possible to use generally known aliphatic, cycloaliphatic, araliphatic and/or aromatic isocyanates, preferably diisocyanates, for example trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanato-methyl)cyclohexane (HXDI), cyclohexane 1,4-diisocyanate, 1-methyl cyclohexane 2,4- and/or 2,6-diisocyanate and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethylbiphenyl diisocyanate, 1,2-diphenylethane diisocyanate and/or phenylene diisocyanate.

As compounds (c2) which are reactive toward isocyanates, it is possible to use the generally known compounds which are reactive toward isocyanates, for example polyesterols, polyetherols and/or polycarbonate diols, which are usually subsumed under the term "polyols", which have number average molecular weights of from 500 to 8000 g/mol, preferably from 600 to 6000 g/mol, in particular from 800 to 4000 g/mol, and preferably an average functionality of from 1.8 to 2.3, preferably from 1.9 to 2.2, in particular 2, and also mixtures thereof.

In a particularly preferred embodiment, the compound (c2) which is reactive toward isocyanates comprises a polytetrahydrofuran having a number average molecular weight of from 600 to 2500 g/mol.

In a further particularly preferred embodiment, the compound (c2) which is reactive toward isocyanates comprises a polyester alcohol, preferably polyester diol, preferably based on adipic acid and 1,4-butanediol, having a number average molecular weight in the range from 500 to 2500 g/mol, particularly preferably from 600 g/mol to 2400 g/mol.

As chain extenders (c3), it is possible to use generally known aliphatic, araliphatic, aromatic and/or cycloaliphatic compounds having a molecular weight of from 50 to 499, preferably 2-functional compounds, for example diamines and/or alkanediols having from 2 to 10 carbon atoms in the alkylene radical, in particular 1,4-butanediol, 1,6-hexanediol and/or dialkylene, trialkylene, tetraalkylene, pentaalkylene, hexaalkylene, heptaalkylene, octaalkylene, nonaalkylene and/or decaalkylene glycols having from 3 to 8 carbon atoms, preferably corresponding oligopropylene and/or polypropylene glycols, with mixtures of the chain extenders also being able to be used.

Suitable catalysts (c4) which, in particular, accelerate the reaction between the NCO groups of the diisocyanates (c1) and the hydroxyl groups of the formative components (c2) and (c3) are the tertiary amines which are known and customary in the prior art, e.g. triethylamine, dimethylcyclohexylamine, N-methylmorpholine, N,N'-dimethylpiperazine, 2-(dimethylamino-ethoxy)ethanol, diazabicyclo[2.2.2] octane and the like, and also, in particular, organic metal compounds such as titanic esters, iron compounds such as iron(III) acetylacetonate, tin compounds, e.g. tin diacetate, tin dioctoate, tin dilaurate or the dialkyltin salts of aliphatic carboxylic acids, e.g. dibutyltin diacetate, dibutyltin dilaurate, or the like. The catalysts are usually used in amounts of from 0.0001 to 0.1 part by weight per 100 parts by weight of polyhydroxyl compound (c2).

Apart from catalysts (c4), customary auxiliaries and/or additives (c5) can also be added to the formative components (c1) to (c3). Mention may be made by way of example of blowing agents, surface-active substances, fillers, flame retardants, nucleating agents, oxidation stabilizers, lubricants and mold release agents, dyes and pigments, optionally further stabilizers, e.g. against hydrolysis, light, heat or discoloration, in addition to the stabilizer mixtures according to the invention, inorganic and/or organic fillers, reinforcing materials and plasticizers.

Apart from the abovementioned components (c1) and (c2) and optionally (c3), (c4) and (c5), it is also possible to use chain regulators, usually ones having a molecular weight of from 31 to 499 g/mol. Such chain regulators are compounds which have only one functional group which is reactive toward isocyanates, e.g. monofunctional alcohols, monofunctional amines and/or monofunctional polyols. Such chain regulators enable a flow behavior to be set in a targeted manner, particularly in the case of TPUs. Chain regulators can generally be used in an amount of from 0 to 5 parts by weight, preferably from 0.1 to 1 part by weight, based on 100 parts by weight of the component (c2) and by definition come under the component (c3).

The reaction can be carried out at customary indexes, preferably at an index of from 60 to 120, particularly preferably at an index of from 80 to 110. The index is defined as the ratio of the total isocyanate groups of the component (c1) used in the reaction to the groups which are reactive toward isocyanates, i.e. the active hydrogens, of the components (c2) and (c3). At an index of 100, one active hydrogen atom, i.e. one group which is reactive toward isocyanates, of the components (c2) and (c3) is present per isocyanate group of the component (d). At indexes above 100, more isocyanate groups than OH groups are present.

The TPU can be produced by the known processes, either continuously, for example by the one-shot or prepolymer process using reaction extruders or the belt process, or batchwise by the known prepolymer process. In these processes, the components (c1), (c2) and optionally (c3), (c4) and/or (c5) to be reacted can be mixed with one another in succession or simultaneously, with the reaction commencing immediately.

In the case of extruded processes, the formative components (c1), (c2) and optionally (c3), (c4) and/or (c5) are introduced individually or as a mixture into the extruder, reacted at, for example, temperatures of from 100 to 280° C., preferably from 140 to 250° C., the TPU obtained is extruded, cooled and pelletized. It may be advantageous to heat treat the TPU obtained at from 80 to 120° C., preferably from 100 to 110° C., for a time of from 1 to 24 hours before further processing.

To produce the expandable particles of thermoplastic polyurethane, the TPU according to the invention is preferably loaded with blowing agent in the suspension or extrusion process.

In the case of the suspension process, the thermoplastic polyurethane is used as pellets and heated with water, a suspension auxiliary and the blowing agent in a closed reactor to above the softening temperature. This results in the polymer particles being impregnated with the blowing agent. The impregnation temperature is preferably greater than 100° C., particularly preferably in the range from 100 to 150° C. and in particular from 110 to 145° C. Under the impregnation conditions, blowing agent diffuses into the polymer pellets. The impregnation time is generally from 0.5 to 10 hours. The hot suspension is subsequently cooled, resulting in the particles solidifying with inclusion of the blowing agent, and the reactor is depressurized. This gives expandable TPU particles which are subsequently separated off from the suspension in a conventional way. Adhering water is generally removed by drying, e.g. in a flow dryer. If necessary, adhering suspension auxiliaries can be removed before or after drying by treating the particles with a suitable reagent. For example, treatment with an acid such as nitric acid, hydrochloric acid, or sulfuric acid can be carried out to remove acid-soluble suspension auxiliaries, e.g. metal carbonates or tricalcium phosphate.

Suitable TPU pellets are, for example, minipellets having a preferred average diameter of from 0.2 to 10 mm, in particular from 0.5 to 5 mm. These usually cylindrical or round minipellets are produced by extrusion of the TPU and optionally further additives, expression from the extruder, optionally cooling and pelletization. In the case of cylindrical minipellets, the length is preferably from 0.2 to 10 mm, in particular from 0.5 to 5 mm.

As blowing agent for the suspension process, preference is given to using organic liquids or inorganic gases or mixtures thereof. Possible organic liquids are halogenated hydrocarbons, but preferably saturated, aliphatic hydrocarbons, in particular those having from 3 to 8 carbon atoms, e.g. butane and pentane. Suitable inorganic gases are nitrogen, air, ammonia and carbon dioxide. Furthermore, mixtures of the blowing agents mentioned can be used. The amount of blowing agent is preferably from 0.1 to 40 parts by weight, in particular from 0.5 to 35 parts by weight and particularly preferably from 1 to 30 parts by weight, based on 100 parts by weight of TPU used. Suitable suspension auxiliaries are water-insoluble inorganic stabilizers such as tricalcium phosphate, magnesium pyrophosphate, metal carbonates; also polyvinyl alcohol and surfactants such as sodium dodecylarylsulfonate. They are usually used in amounts of from 0.05 to 10% by weight, based on the thermoplastic polyurethane.

In the extrusion process, the thermoplastic polyurethane is, in an extruder, melted and mixed with a blowing agent which is fed into the extruder. The mixture comprising blowing agent is expressed and pelletized under such pressure and temperature conditions that it does not expand. An industrially advantageous method is underwater pelletization in a water bath which has a temperature below 100° C. and is under a pressure of at least 2 bar (absolute). The temperature must not be too low since otherwise the melt solidifies at the die plate and must not be too high since otherwise the melt expands. The higher the boiling point of the blowing agent and the lower the amount of blowing agent, the higher can the water temperature be and the lower can the water pressure be. In the case of the particularly preferred blowing agents pentane and butane, the optimal water bath temperature is from 30 to 60° C. and the optimal water pressure is from 8 to 12 bar (absolute). It is also possible to use other suitable cooling media instead of water. Water ring pelletization can likewise be employed. Here, the cutting space is encapsulated in such a way that the pelletization apparatus can be operated under superatmospheric pressure. This gives expandable particles of thermoplastic polyurethane which are subsequently separated by water and optionally dried.

Possible extruders are all conventional screw machines, in particular single-screw and twin-screw extruders (e.g. model ZSK from Werner & Pfleiderer), Ko-Kneters, Kombiplast machines, MPC-knead mixers, FCM mixers, KEX kneading screw extruders and shearing roll extruders, as described, for example, in Saechtling (editor), Kunststoff-Taschenbuch, 27th edition, Hanser-Verlag Munich 1998, chapters 3.2.1 and 3.2.4. The extruder is usually operated at a temperature at which the TPU is present as a melt, for example at from 150 to 250, in particular from 180 to 210° C. Speed of rotation, length, diameter and configuration of the extruder screw(s), amounts fed in and extruder throughput are selected in a known manner so that the additives are uniformly distributed in the extruded TPU.

In the extrusion process, volatile organic compounds having a boiling point at atmospheric pressure (1013 mbar) of from −25 to 150° C., in particular from −10 to 125° C., are preferably used as blowing agents. Well-suited blowing agents are hydrocarbons which are preferably halogen-free, in particular $C_{4-10}$-alkanes, for example the isomers of butane, pentane, hexane, heptane and octane, particularly preferably s-pentane. Further suitable blowing agents are relatively bulky compounds such as alcohols, ketones, esters, ethers and organic carbonates. It is also possible to use mixtures of the blowing agents mentioned. These blowing agents are preferably used in an amount of from 0.1 to 40 parts by weight, particularly preferably from 0.5 to 35 parts by weight and in particular from 1 to 30 parts by weight, based on 100 parts by weight of thermoplastic polyurethane used.

If preferably previously expanded particles of thermoplastic polyurethane are used instead of expandable particles of thermoplastic polyurethane in the process of the invention for producing the hybrid material of the invention, these are preferably obtained by expansion of the expandable particles, for example when the impregnated pellets are depressurized at temperatures above the softening temperature of the thermoplastic polyurethane in the suspension process or when, in the extrusion process, the output from the extruder is not cooled and not kept under superatmospheric pressure.

Auxiliaries and/or additives can optionally also be added to the reaction mixture for producing the matrix or particles. Mention may be made by way of example of surface-active substances, foam stabilizers, cell regulators, mold release agents, fillers, dyes, pigments, hydrolysis inhibitors, odor-absorbing substances and fungistatic and bacteriostatic substances.

Possible surface-active substances are, for example, compounds which serve to aid the homogenization of the starting materials and may also be suitable for regulating the cell structure. Mention may be made by way of example of emulsifiers such as sodium salts of castor oil sulfates or of fatty acids and also salts of fatty acids with amines, e.g. diethylamine oleate, diethanolamine stearate, diethanolamine ricinoleate, salts of sulfonic acids, e.g. alkali metal or ammonium salts of dodecylbenzenesulfonic or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil or ricinoleic esters, Turkey red oil and peanut oil, and cell regulators such as paraffins, fatty alcohols and dimethylpolysiloxanes. Furthermore, oligomeric acrylates having polyoxyalkylene and fluoroalkane radicals as side groups are also suitable for improving the emulsifying action, the cell structure and/or stabilizing the foam. The surface-active substances are usually employed in amounts of from 0.01 to 5 parts by weight, based on 100 parts by weight of the polyol component.

Suitable mold release agents are, for example: reaction products of fatty acid esters with polyisocyanates, salts of polysiloxanes comprising amino groups with fatty acids, salts of saturated or unsaturated (cyclo)aliphatic carboxylic acids having at least 8 carbon atoms with tertiary amines and also, in particular, internal mold release agents such as carboxylic esters and/or carboxamides prepared by esterification or amidation of a mixture of montanic acid and at least one aliphatic carboxylic acid having at least 10 carbon atoms with at least bifunctional alkanolamines, polyols and/or polyamines having molecular weights of from 60 to 400 (EPA-153 639), mixtures of organic amines, metal salts of stearic acid and organic monocarboxylic and/or dicarboxylic acids or anhydrides thereof (DE-A-3 607 447) or mixtures of an imino compound, the metal salt of a carboxylic acid and optionally a carboxylic acid (U.S. Pat. No. 4,764,537).

For the purposes of the present invention, fillers, in particular reinforcing fillers, are the customary organic and inorganic fillers, reinforcing materials, weighting agents, agents for improving the abrasion behavior in paints, coating compositions, etc., known per se. Specific examples are: inorganic fillers such as siliceous minerals, for example sheet silicates such as antigorite, bentonite, serpentine, hornblendes, amphiboles, chrysotile, talc; metal oxides such as kaolin, aluminum oxides, titanium oxides, zinc oxide and iron oxides, metal salts such as chalk, barite and inorganic pigments such as cadmium sulfide, zinc sulfide and also glass, etc. Preference is given to using kaolin (China clay), aluminum silicate and coprecipitates of barium sulfate and aluminum silicate and also natural and synthetic fibrous minerals such as wollastonite, metal and in particular glass fibers of various lengths, which may optionally be coated with a size. Possible organic fillers are, for example: carbon black, melamine, rosin, cyclopentadienyl resins and graft polymers and also cellulose fibers, polyamide fibers, polyacrylonitrile fibers, polyurethane fibers, polyester fibers based on aromatic and/or araliphatic dicarboxylic esters and in particular carbon fibers.

The inorganic and organic fillers can be used individually or as mixtures and are advantageously added to the matrix in amounts of from 0.5 to 50% by weight, preferably from 1 to 40% by weight, based on the weight of the matrix, but the content of mats, nonwovens and woven fabrics of natural and synthetic fibers can reach values of up to 80% by weight.

In a combination foam according to the invention, the proportion by volume of the foamed particles of thermoplastic polyurethane is preferably 20% by volume and more, particularly preferably 40% by volume and more, more preferably 60% by volume and more and in particular 70% by volume and more, in each case based on the volume of the combination foam of the invention. A suitable upper limit is 99% by volume.

In a preferred embodiment, the equivalence ratio of NCO groups of the polyisocyanates to some of the reactive hydrogen atoms of the polyols is from 1:0.8 to 1:1.25, preferably from 1:0.9 to 1:1.15. The integral foams are preferably produced by the one-shot process using the low-pressure or high-pressure technique inclosed, advantageously heated molds. The molds are usually made of metal, e.g. aluminum or steel. These processes are described, for example, by Piechota and Röhr in "Integralschaumstoff", Carl-Hanser-Verlag, Munich, Vienna, 1975, or in Kunststoff-Handbuch, volume 7, Polyurethane, 3rd edition, 1993, chapter 7.

The starting components are for this purpose mixed at a temperature of from 15 to 90° C., preferably from 20 to 35° C., and introduced, optionally under superatmospheric pressure, into the closed mold. Mixing can be carried out mechanically by means of a stirrer or a stirring screw or under high pressure in the opposed jet injection process. The mold temperature is advantageously from 20 to 90° C., preferably from 30 to 60° C.

The amount of the reaction mixture introduced into the mold is calculated so that the integral foam moldings obtained have a density of from 0.08 to 0.70 g/cm$^3$, in particular from 0.12 to 0.60 g/cm$^3$. The degrees of compaction for producing the moldings having a compacted outer zone and a cellular core are in the range from 1.1 to 8.5, preferably from 2.1 to 7.0.

The processes of the invention make it possible to produce combination foams which have a matrix composed of polyurethane and foamed particles of thermoplastic polyurethane comprised therein and in which there is a homogeneous distribution of the foamed particles. Particularly when using expandable particles in the process for producing the hybrid materials of the invention, no specific auxiliaries or apparatuses are required to ensure homogeneous distribution after introducing the starting substances in the mold. Furthermore, the expandable particles can also easily be used in a process according to the invention since, owing to their small size, they are free-flowing and place no particular demands on processing.

If, preferably, previously expanded particles of thermoplastic polyurethane are used for producing integral polyurethane foams or compact moldings, a closed mold is filled with the expanded particles and the reaction mixture comprising the remaining constituents is subsequently injected, owing to the large density differences between the reaction mixture of the not yet fully reacted matrix material and the expanded particles of thermoplastic polyurethane. Particularly at low degrees of fill with the expanded particles, techniques for homogeneously distributing the expanded particles, e.g. slow rotation of the mold, are optionally employed.

The combination foams of the invention, in particular having a matrix of cellular polyurethane, display very good adhesion of the matrix material to the expanded particles of thermoplastic polyurethane. A combination foam according to the invention does not rupture at the interface of matrix material and expanded particles of thermoplastic polyurethane. This makes it possible to produce combination foams which have improved mechanical properties, e.g. tensile strength and elasticity, compared to conventional polyurethane materials having the same density. Thus, the tensile strength based on DIN EN ISO 527-1 of a combination foam according to the invention having a cellular matrix is preferably greater than 2500 kPa at an average density of from 0.25 to <0.4 g/cm$^3$ and is preferably greater than 1500 kPa at an average density of from 0.1 to <0.25 g/cm$^3$. A combination foam having a matrix of cellular polyurethane preferably has an average density of from 0.05 to 0.60 g/cm$^3$, particularly preferably from 0.10 to 0.50 g/cm$^3$ and in particular from 0.20 to 0.30 g/cm$^3$.

The elasticity of combination foams according to the invention in the form of integral foams is preferably greater than 40% and particularly preferably greater than 50% in accordance with DIN 53512.

Furthermore, the combination foams of the invention based on integral foams display high rebound resiliences at a low density and are therefore highly suitable as materials for shoe soles. Light and comfortable soles having good durability properties can be obtained in this way. Such materials are particularly suitable as throughholes for sports shoes.

A further advantage of a process according to the invention is that combination foams having a low average density, in particular integral foams, can be produced without disadvantages usual in the production of conventional foams having the same density, e.g. sink holes or skin detachment places, occurring. As a result, fewer rejects are obtained, as a result of which costs can be saved.

Further possible uses of combination foams according to the invention are upholstery, for example of furniture, and mattresses.

To produce layered materials, reference may be made to WO 2008/087078.

The invention is illustrated by the following examples.

EXAMPLES

To determine the mechanical properties of the cured foam plates, four tensile bars having a gauge section width of 25 mm are stamped from each plate. The tensile strength and the elongation at break are determined on these tensile strips by a method based on DIN EN ISO 527-1, using, as a deviation from the standard, a gauge section width of 25 mm and a test velocity of 100 mm/min. The mean was subsequently determined from the results for each single plate.

The following polyurethane systems as shown in Table 1 were examined. Examples 1-3 according to the invention were combined with expanded thermoplastic polyurethane particles (hereinafter referred to as ETPU for short) having a bulk density of 86 g/l. Test plates were produced in a 0.6 l shoe test plate mold heated to 50° C. and these plates were subsequently tested mechanically. The formulation compositions including the proportions of the ETPU in the test specimen are indicated in Table 1. The index, viz. the molar ratio of isocyanate component to polyol component, is 1 with a deviation of less than 0.1 in all systems.

TABLE 1

|  | Ex. 1 | Ex. 2 | Ex. 3 | Comp. 1 | Comp. 2 | Comp. 3 | Comp. 4 | Comp. 5 |
|---|---|---|---|---|---|---|---|---|
| Polyol 1 | 46.4 | 45.3 | 41.9 | 31.1 | 68.4 | 52.1 | 28.6 | 53.3 |
| Polyol 2 | 5.9 | 6.2 | 7.1 | 10.1 |  | 9.5 |  |  |
| Polyol 3 | 10 | 10.6 | 12.1 | 17.2 |  |  | 18.6 | 9.4 |
| Polyol 4 |  |  |  |  |  | 1.2 |  |  |
| Polyol 5 |  |  |  |  |  |  | 8.6 |  |
| Iso 1 | 29.6 | 29.9 | 30.5 | 32.8 | 25.5 | 19.4 | 35.4 | 30.7 |
| Iso 2 |  |  |  |  |  | 12 |  |  |
| CE | 5.1 | 5.1 | 5 | 4.5 | 6.1 | 4.7 | 7.3 | 5.6 |
| Stabi | 1.7 | 1.9 | 2.2 | 3 |  |  | 0.7 |  |
| Cat 1 | 0.1 | 0.1 | 0.2 | 0.2 |  |  |  |  |
| Cat 2 |  |  |  |  |  | 0.01 |  |  |
| Cat 3 |  |  |  |  |  |  | 0.95 | 0.3 |
| Blowing agent 1 | 0.3 | 0.3 | 0.35 | 0.5 |  |  | 0.06 | 0.3 |
| Additive 1 | 0.3 | 0.3 | 0.35 | 0.5 |  |  |  |  |
| Additive 2 | 0.4 | 0.4 | 0.3 | 0.05 |  | 0.8 |  | 0.4 |
| Additive 3 |  |  |  |  |  | 0.4 |  |  |
| Additive 4 |  |  |  |  |  | 0.01 |  |  |
| % by weight of ETPU in the total formulation | 41.7 | 38.5 | 29.4 |  | 100 | 76.9 |  |  |

The meanings of the abbreviations are as follows:

ETPU: expanded TPU particles having a bulk density of 86 g/l

Polyol 1: polytetrahydrofuran having an average molecular weight (MW) of 1500 g/mol Polyol 2: castor oil having an average molecular weight (MW) of 900 g/mol Polyol 3: polypropylene glycol having an average molecular weight (MW) of 2000 g/mol Polyol 4: polypropylene glycol having an average molecular weight (MW) of 200 g/mol Polyol 5: acrylonitrile/styrene-comprising polypropylene glycol having an average molecular weight (MW) of 4400 g/mol Iso 1 diphenylmethane 4,4'-diisocyanate partly carbodiimide-modified and having a total NCO content of 33.6 parts by mass Iso 2 aliphatic polyisocyanate based on isocyanuratized hexamethylene diisocyanate and having a proportion by mass of NCO of 22 parts CE chain extender, diol having a hydroxyl number of greater than 580 mg/g Stabi polyether-siloxane copolymers Cat 1 1-methylimidazole Cat 2 dimethyltin carboxylate Cat 3 catalyst mixture based on tertiary amines, triethylenediamine, triethanolamine and dimethylamino ether Blowing agent 1 water Additive 1 sulfated castor oil, sodium salt in, on a fatty acid ester basis, 50% of water Additive 2 antioxidant, sterically hindered phenol derivative Additive 3 K—Ca—Na—Al silicate in castor oil Additive 4 polydimethylsiloxane

EXAMPLES

The production and properties of the polyurethane systems are described in the following examples. In examples 1, 2 and 3 and comparative examples 1 and 4, a prepolymer having a total isocyanate content of 18 parts by mass and comprising the reaction products of a partly carbodiimide-modified diphenylmethane 4,4'-diisocyanate with a polypropylene glycol having an average molecular weight (MW) of 1970 g/mol and tripropylene glycol and also a UV stabilizer was used. These individual prepolymer constituents are shown in their proportions in table 1. Corresponding to the processing, this prereaction product is referred to as prepolymer in the following examples.

Furthermore, the ETPU particles comprising 61.2 parts by mass of polytetrahydrofuran having an average molecular weight (MW) of 1000 g/mol, 31.8 parts by mass of diphenylmethane 4,4-diisocyanate having a total NCO content of 33.6 parts by mass, 6 parts by mass of 1,4-butanediol having a hydroxyl number of 1245 mg/g and also 0.1 part by mass of UV stabilizer corresponding to their total proportion as shown in Table 1 were produced. They were produced in a manner analogous to WO 2008/087078, pages 23/24. They were processed in fully reacted, expanded forms. The products according to the invention were produced in the laboratory using a blender.

Example 1 (According to the Invention)

In accordance with table 1, the constituents with the exception of the prepolymer and the ETPU particles were weighed in together and homogenized. This A component was heated to 50° C. in an oven. This was followed by the addition of prepolymer at room temperature and intensive mixing for 10 seconds. These components were poured into a second vessel into which the ETPU particles had been weighed beforehand. Immediately afterward, the particles in the second vessel were mixed with the PU system for 30 s. This particle/binder mixture was subsequently introduced into a metal test plate mold heated to 50° C. and left in the mold until curing was complete. Test specimens on which the mechanical tests were carried out were cut from the test plates produced in this way.

Example 2 (According to the Invention)

The test specimens were produced and tested as in example 1. The constituents were varied corresponding to the column example 2 shown in table 1.

Example 3

The test specimens were produced and tested as in example 1. The constituents were varied corresponding to the column for example 3 shown in table 1.

Comparative Example 1 (Without ETPU)

In accordance with table 1, the constituents with the exception of the prepolymer were weighed in together and homogenized. This A component was heated to 50° C. in an oven. This was followed by the addition of prepolymer at room temperature and intensive mixing for 10 seconds. Immediately afterward the system was introduced into a metal test plate mold heated to 50° C. and left in the mold until curing was complete. Test specimens on which the mechanical tests were carried out were cut from the test plates produced in this way. Comparative example 1 corresponds to the matrix formulation of example 3, with the resulting density having been matched to example 1.

Comparative Example 2

The ETPU particles were introduced into a metal mold suitable for steam fusion. Steam was subsequently introduced, as a result of which the ETPU particles sintered together. Test specimens on which the mechanical tests were carried out were cut from the test plates produced in this way.

Comparative Example 3

In accordance with table 1, the constituents with the exception of the isocyanate component 3 and the ETPU particles were weighed in together and homogenized. This was followed by addition of the isocyanate and intensive mixing for 10 seconds. All components were processed unheated at a room temperature of 22° C. The components were poured into a second vessel into which the ETPU particles had been weighed beforehand. Immediately afterward, the particles were introduced into the second vessel with the PU system for 30 s, leveled uniformly and left in the mold until curing was complete. Test specimens on which the mechanical tests were carried out were cut from the test plates produced in this way.

Comparative Example 4

In accordance with table 1, the constituents with the exception of the prepolymer were weighed in together and homogenized. This A component was heated to 50° C. in an oven. This was followed by addition of the prepolymer at room temperature and intensive mixing for 10 seconds. Directly afterward, the system was introduced into a metal test plate mold heated to 50° C. and left in the mold until curing was complete. Test specimens on which the mechanical tests were carried out were cut from the test plates produced in this way.

Comparative Example 5

In accordance with table 1, the constituents with the exception of the prepolymer were weighed in together and homogenized. This A component was heated to 50° C. in an oven. This was followed by addition of the prepolymer at room temperature and intensive mixing for 10 seconds. Immediately afterward, the system was introduced into a metal test plate mold heated to 50° C. and left in the mold until curing was complete. Test specimens on which the mechanical tests were carried out were cut from the test plates produced in this way.

Properties of the Products Obtained

TABLE 2

|  | Ex. 3 | Comp. 1 | Comp. 2 | Comp. 5 |
|---|---|---|---|---|
| Density | 290 | 310 | 300 | 300 |
| Tensile strength | 2816 | 1087 | 700 | 1400 |
| Elongation at break | 190 | 126 | 100 | n. d. |

Density overall density of the test plate [kg/m$^3$]
Tensile strength tensile strength [kPa] in accordance with DIN EN ISO 527-1
Elongation at break elongation at break [%] in accordance with DIN EN ISO 527-1
n. d. not determined It can be seen from table 2 that the examples according to the invention in the same low density range of 300 g/l+/−10 g/l display a higher tensile strength than comparable systems. The elongation at break values are likewise better in the case of the samples according to the invention.

TABLE 3

|  | Ex. 1 | Ex. 2 | Comp. 3 | Comp. 4 |
|---|---|---|---|---|
| Density | 215 | 270 | 175 | 275 |
| Tensile strength | 1793 | 3047 | 264 | 2400 |
| Rebound | 53 | 52 | 53 | 33 |

Density overall density of the test plate [kg/m$^3$]
Tensile strength tensile strength [kPa] in accordance with DIN EN ISO 527-1
Rebound rebound resilience [%] in accordance with DIN EN ISO 8307

Table 3 shows that the examples according to the invention have better tensile strengths and rebound resiliences even at lower densities. No testable specimens in this low density range could be produced from comparative examples 1, 2 and 5.

The invention claimed is:

1. A combination foam, comprising:
a matrix comprising polyurethane foam; and
foamed particles of thermoplastic polyurethane comprised therein,
wherein the matrix and the particles each comprises polyol components and polyisocyanate components, wherein at least 50% by weight of building blocks forming the polyol component of the matrix and particles are identical and at least 50% by weight of building blocks forming the polyisocyanate component of the matrix and particles are identical, whereby the matrix is completely open-cell and the foamed particles in the matrix are completely closed-cell.

2. The combination foam according to claim 1, wherein at least 60% by weight of the building blocks forming the polyol component of the matrix and particles are identical and at least 60% by weight of the building blocks forming the polyisocyanate component of the matrix and particles are identical.

3. The combination foam according to claim 2, wherein at least 65% by weight of the building blocks forming the polyol component of the matrix and particles are identical and at least 85% by weight of the building blocks forming the polyisocyanate component of the matrix and particles are identical.

4. The combination foam according to claim 1, wherein the foamed particles have a diameter of from 0.1 mm to 10 cm, and are spherical or ellipsoidal.

5. The combination foam according to claim 1, wherein the foamed particles have a density of from 0.005 to 0.50 g/cm$^3$.

6. The combination foam according to claim 1, wherein the thermoplastic polyurethane of the foamed particles and the polyurethane foam of the matrix comprise polytetrahydrofuran having a number average molecular weight of from 600 to 2500 g/mol.

7. The combination foam according to claim 1, wherein the thermoplastic polyurethane of the foamed particles and the polyurethane foam of the matrix comprise polyester alcohol having a number average molecular weight of from 500 to 2500 g/mol.

8. The combination foam according to claim 1, wherein the matrix is a foam having a density of from 0.03 to 0.8 g/cm$^3$.

9. The combination foam according to claim 1, wherein the matrix and the particles are present in a weight ratio of from 0.1 to 10:1 in the combination foam.

10. The combination foam according to claim 1, wherein the combination foam is suitable as shoe soles, bicycle saddles, upholstery, in components in automobile interiors and exteriors, in balls and sports equipment or as floor covering.

11. A process for producing the combination foam according to claim 1, comprising reacting the polyol components and polyisocyanate components to form the matrix comprising polyurethane foam and optionally chain extenders, crosslinkers, catalysts, blowing agents, further additives or mixtures thereof, in the presence of the foaming or foamed particles of thermoplastic polyurethane.

12. The process according to claim 11, wherein no external blowing agent is employed.

13. The process according to claim 11, comprising:
first preparing an isocyanate prepolymer having an NCO content of from 1 to 20% by weight from polyisocyanate components and polyol components of the matrix;
optionally subsequently mixing at least one chain extender, crosslinker, catalyst, further additive or a mixture thereof and the isocyanate prepolymer with the foamed particles of the thermoplastic polyurethane to form a composite; and then
curing the composite with water.

* * * * *